US012218551B2

(12) United States Patent
Matschas et al.

(10) Patent No.: US 12,218,551 B2
(45) Date of Patent: Feb. 4, 2025

(54) ROTOR CARRIER FOR AN ELECTRIC MACHINE AND ELECTRIC MACHINE HAVING THE SAME

(71) Applicant: ZF FRIEDRICHSHAFEN AG, Friedrichshafen (DE)

(72) Inventors: Steffen Matschas, Bad Bocklet (DE); Steffen Einenkel, Priesendorf (DE); Thomas Walter, Kolitzheim (DE); Gerald Viernekes, Hassfurt (DE); Günter Fahl, Sulzfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 277 days.

(21) Appl. No.: 17/735,620

(22) Filed: May 3, 2022

(65) Prior Publication Data

US 2022/0360146 A1 Nov. 10, 2022

(30) Foreign Application Priority Data

May 6, 2021 (DE) .................... 10 2021 204 589.8

(51) Int. Cl.
*H02K 11/21* (2016.01)
*B60K 6/26* (2007.10)
*H02K 1/32* (2006.01)
*H02K 7/00* (2006.01)
*H02K 9/19* (2006.01)

(52) U.S. Cl.
CPC .............. *H02K 11/21* (2016.01); *B60K 6/26* (2013.01); *H02K 1/32* (2013.01); *H02K 7/003* (2013.01); *H02K 9/19* (2013.01)

(58) Field of Classification Search
CPC .......... H02K 11/21; H02K 1/32; H02K 7/003; H02K 9/19; B60K 6/26
See application file for complete search history.

(56) References Cited

U.S. PATENT DOCUMENTS

2015/0280525 A1* 10/2015 Rippel ................ H02K 9/24
310/54
2016/0164356 A1 6/2016 Sakurai et al.
(Continued)

FOREIGN PATENT DOCUMENTS

DE 10244102 4/2004
DE 102013221643 4/2015
(Continued)

OTHER PUBLICATIONS

Office Action for corresponding German Patent Application No. 10 2021 204 589.8.

*Primary Examiner* — Forrest M Phillips
(74) *Attorney, Agent, or Firm* — COZEN O'CONNOR (57) ABSTRACT

A rotor carrier for an electric machine having a sleeve-shaped receiving region and at least one flange-like carrier region connected to a hub or shaft. The receiving region has on its outer circumferential surface at least one driving groove extending in axial direction, and a plurality of radial oil bore holes are provided in the receiving region so as to be distributed over the circumference. An encoder wheel having a nonmagnetic material is provided at an axial end of the rotor carrier, and in that the encoder wheel protrudes over the receiving region in radial direction to serve as an axial limit for a rotor lamination stack.

15 Claims, 4 Drawing Sheets

(56) References Cited

U.S. PATENT DOCUMENTS

2016/0226327 A1* 8/2016 Rippel .................. H02K 9/197
2019/0334413 A1* 10/2019 Rippel .................... H02K 1/20

FOREIGN PATENT DOCUMENTS

| DE | 102014216367 | 2/2016 |
| DE | 102017123144 | 1/2019 |
| DE | 102019202567 | 8/2020 |
| DE | 102019120787 | 2/2021 |
| KR | 20140067345 | 6/2014 |

* cited by examiner

ROTOR CARRIER FOR AN ELECTRIC MACHINE AND ELECTRIC MACHINE HAVING THE SAME

BACKGROUND OF INVENTION

1. Field of the Invention

The disclosure is directed to a rotor carrier for an electric machine, particularly in a hybrid powertrain of a vehicle.

2. Description of Related Art

Besides solid rotors, annular rotors, which are arranged around a rotational axis, are also known in the prior art in electric machines. It is known, for example, from DE 10 2014 216 367 A1 or KR 2014 0067345 A to incorporate cutouts and projections at the shaft in the rotor carrier to cooperate with a position sensor.

SUMMARY OF THE INVENTION

It is the object of one aspect of the invention to provide an alternative to the prior art that has an improved support of the rotor, makes optimal use of installation space, and is also simple and economical to produce.

One aspect of the invention is a rotor carrier for an electric machine comprising a sleeve-shaped receiving region and at least one flange-like carrier region, which is connected to a hub or shaft, the receiving region having on its outer circumferential surface at least one driving groove extending in axial direction, and a plurality of radial oil bore holes are provided in the receiving region so as to be distributed over the circumference. One aspect of the invention is characterized in that an encoder wheel comprising a nonmagnetic material is provided at an axial end of the rotor carrier, and in that the encoder wheel protrudes over the receiving region in radial direction to serve as an axial limit for a rotor lamination stack.

Due to the sleeve-shaped receiving region and the flange-like carrier region, the weight and, therefore, inertia are kept low compared with a solid rotor core. Further, installation space is afforded in that further components of the powertrain can be arranged radially inside of the sleeve-shaped receiving region. To achieve a reliable driving of the rotational movement of the rotor, the receiving surface of the rotor carrier has at the outer side at least one axially extending driving groove that allows a positive engagement connection to a corresponding projection at the rotor in circumferential direction. Radial oil bore holes are likewise provided in the receiving region to allow passage of a cooling medium, particularly in the form of an oil present in the region of the powertrain.

An encoder wheel protruding radially over the receiving region is provided at one axial end to axially limit the rotor or, more precisely, the rotor lamination stack on the receiving region. This encoder wheel is produced from a nonmagnetic material to prevent as far as possible a negative influence on the magnetic properties of the electric machine, particularly the rotor.

Embodiment forms of a rotor carrier according to the invention are characterized in that the encoder wheel has markings for a rotational position sensor. A rotor position sensor can be used to acquire the position or rotational angle of the rotor. The rotor position sensor detects markings which are provided on the encoder wheel. The markings may comprise optical and/or mechanical markings, for example, cutouts, projections, different material or surface qualities, such as color, texture, and/or material, depending on the rotor position sensor being utilized.

Rotor carriers according to embodiment forms are characterized in that the encoder wheel is connected to the receiving region and/or carrier region by material bond and/or positive engagement. In order to provide a reliable connection, particularly one that is fixed with respect to relative rotation, the encoder wheel is connected to the further parts of the rotor carrier by material bond, e.g., by welding, and/or by positive engagement.

Embodiment forms of a rotor carrier are characterized in that a plurality of axial cooling grooves are provided to be distributed over the circumference at the outer circumferential surface of the receiving region, and in that the oil bore holes have a diameter that is greater than the inside diameter of the cooling grooves. Because the oil bore hole has a diameter that is greater than the inside diameter of the cooling groove, the oil flow can be improved, since oil can also flow in laterally via the groove sides. This effect is advantageous, particularly when combined with grooves which are arranged at the inner circumferential surface so as to be offset over the circumference, when a diameter that also opens the sides of the grooves at the inner circumferential surface is selected.

Preferred embodiment forms of a rotor carrier are characterized in that at least a portion of the cooling grooves extends up to the encoder wheel, and in that the encoder wheel has apertures in alignment with the cooling grooves. To avoid a closure of the cooling grooves due to the radially outwardly protruding encoder wheel, the encoder wheel has apertures which are in alignment with at least a portion of the cooling grooves. Suitable apertures within the meaning of the invention can also be formed by a cooling channel which communicates with the cooling grooves, is formed in or with the encoder wheel and has one or more outlets. It is not compulsory that the one or more outlets be aligned with a cooling groove.

Rotor carriers according to preferred embodiment forms are characterized in that the cooling groove has a closure portion such that the cooling groove does not extend over the entire axial length, and in that the closure portion is arranged in an area between the oil bore hole and the nearest axial end of the rotor carrier. In order to achieve a more selective guiding of oil, at least a portion of the cooling grooves can have a closure portion by which the cross section is closed in a plane of the cooling groove perpendicular to the rotational axis of the electric machine. For the longest possible contact with the oil, the closure portion is provided in the area up to the nearest axial end, particularly when the oil bore holes are not centrally arranged.

Embodiment forms of a rotor carrier are characterized in that the cooling grooves are provided at their radially outer, axially extending end with run-in bevels or run-in radii. The transition of the wall of the cooling grooves into the outer circumferential surface is advantageously provided with a run-in bevel or a run-in radius to prevent a sharp edge. This is advantageous particularly to prevent the formation of burs projecting into the cooling groove in case of a possible mechanical after-machining, particularly a cutting after-machining, of the circumferential surface and to reduce tool loading so that tool life is prolonged. This after-machining can serve to eliminate dimensional flaws from production-related causes or to comply with dimensional tolerances. Depending on the dimensional accuracy of the starting component, the transitions may vary along the circumference subsequent to machining, and may even sometimes have a sharp edge.

Rotor carriers according to embodiment forms are characterized in that there is a circumferential oil dam at the inner circumferential surface of the receiving region at an axial end remote of the encoder wheel, this oil dam projecting inward in radial direction to form a collection space for cooling oil. In order to ensure a sufficient amount of oil for cooling at the inner circumferential surface of the receiving region, an oil dam is preferably provided at least at the open end of the rotor carrier. As a result of the oil dam, a toroidal collection space is formed at the inner circumferential surface in which oil can collect for cooling particularly when the rotor carrier is rotating.

Embodiment forms of a rotor carrier are characterized in that a plurality of driving grooves for driving different lamination stack portions are provided to be distributed over the circumference, and an angle between the driving grooves deviates by an interleaving angle from a uniform distribution. To improve characteristics, the lamination stack of a rotor is often divided into a plurality of subregions and these lamination stack portions are arranged to be offset in circumferential direction, that is, twisted by a determined angle relative to one another. An offset of this kind can be achieved, for example, by different rotor laminations for the individual lamination stack portions, although this increases the quantity of different component parts and makes production more expensive. Alternatively, or possibly also additionally, different driving grooves are suggested for the individual lamination stack portions at the rotor carrier, which different driving grooves are arranged to be distributed over the circumference and provided with a suitable offset at a distance deviating from a uniform pitch.

Rotor carriers according to embodiment forms are characterized in that at least two of the component parts comprising receiving region, carrier region or encoder wheel are formed integrally. To reduce the quantity of component parts, a plurality of parts of the rotor carrier, particularly component parts which are fixedly connected to one another, especially by material bond, can also be formed integrally. For example, the receiving region and the carrier region could be produced as a joint pot-shaped part. The encoder wheel could also be formed integral with the carrier region.

Embodiment forms of a rotor carrier are characterized in that a side of a clutch device is connected to the inner circumferential surface of the receiving region and/or carrier region so as to be fixed with respect to rotation relative to it. In order to minimize the required installation space, it is advantageous when a clutch device is arranged at least partially inside of the receiving region and is connected to the latter and/or to the carrier region.

A further aspect of the invention is an electric machine with a rotor carrier according to embodiment forms according to the invention.

Electric machines according to embodiment forms are characterized in that an oil dam is provided at the rotor carrier, in that a housing portion connected to a stator extends into the axial end region remote of the encoder wheel, and in that the housing portion has a drip edge for guiding cooling oil into the collection space of the rotor carrier. In order to further improve cooling and to guide additional cooling oil to the rotor carrier, a housing portion advantageously has a drip edge which extends into the open axial region inside the receiving region and accordingly guides oil dripping from the drip edge as oil-guiding element into the collection space formed by the oil dam at the inner circumferential surface of the receiving region.

Preferred embodiment forms of an electric machine are characterized in that the drip edge extends in circumferential direction only over a partial area. Because the drip edge only extends over a lower portion of the circumference, the oil flow running over the housing portion can also flow from above onto a shaft or hub to improve lubrication thereof.

Another aspect of the invention is a powertrain comprising an electric machine according to the described embodiment forms.

A further aspect of the invention is a vehicle with a powertrain according to one of the described embodiment forms. The described advantages can be achieved correspondingly in this way.

The features of the embodiment forms may be combined in any desired manner.

BRIEF DESCRIPTION OF THE DRAWINGS

The invention will be described in more detail in the following referring to drawings. Like or similar elements are designated by consistent reference numerals. In particular, the drawings show.

DETAILED DESCRIPTION OF THE PRESENTLY PREFERRED EMBODIMENTS

Figure 1:
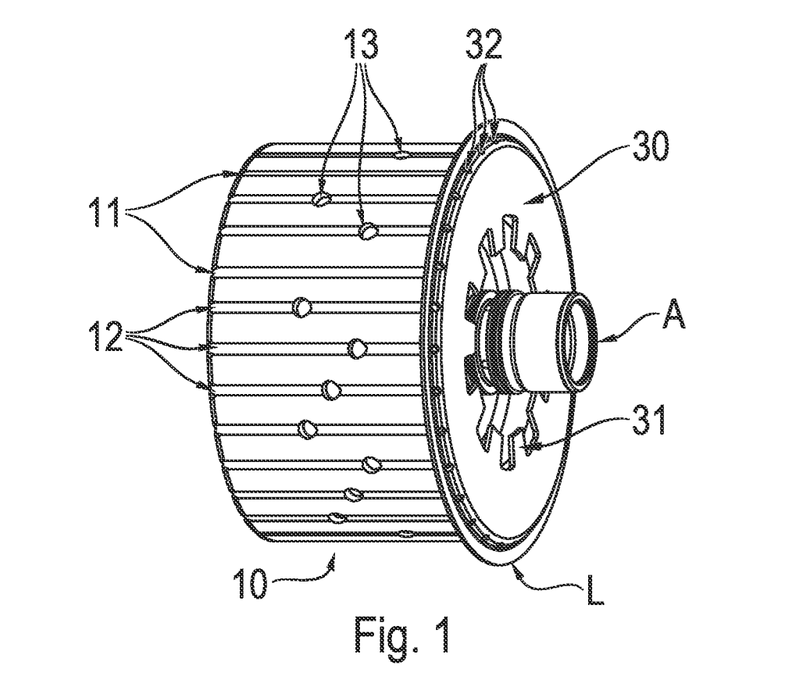
FIG. 1 is a perspective view of a rotor carrier.

FIG. 1 shows an embodiment example of a rotor carrier in a perspective view. In addition to the rotor carrier, a portion of the axle A and hub to which the rotor carrier is connected via the carrier region 20, not visible in FIG. 1, is also shown. The encoder wheel 30 is arranged at an axial end of the rotor carrier.

A plurality of cooling grooves 12, which extend in axial direction, is provided at the outer circumference of the receiving region 10. Together with the rotor lamination stack R mounted on the receiving region 10, these cooling grooves 12 form a cooling channel. The cooling grooves 12 are provided with oil from the inside via oil bore holes 13, the oil flowing along the cooling grooves 12 to the axial ends of the receiving region 10 and exiting at at least one of the ends. In the depicted embodiment example, the axial end remote of the encoder wheel 30 is open.

For cooling as uniformly as possible over the axial length, the oil bore holes 13 in FIG. 1 are arranged centrally in the receiving region 10 with a slight axial offset. An excessive material weakening of the rotor carrier along a plane extending perpendicular to the rotational axis is prevented as a result of the axial offset. Owing to the relatively central arrangement, an extensively uniform cooling effect is produced in both axial directions.

In the depicted embodiment example, the oil bore holes 13 have a diameter greater than the inside diameter of the cooling grooves 12 in circumferential direction. The influx of cooling oil is facilitated in this way because the cooling oil can also enter via the side walls of the cooling groove 12. This step is particularly advantageous when grooves are also arranged at the inner circumferential surface of the receiving region 10 so as to alternate in circumferential direction with the cooling grooves 12 at the outer circumferential surface. The oil bore holes 13, which are preferably arranged centrally with respect to the cooling grooves 12, have at least a diameter that is greater than or at least equal to the inside diameter of the cooling groove 12 in circumferential direction plus twice the wall thickness of the sides of the cooling groove 12.

In order to achieve a cooling channel which is as tight as possible, it is advantageous when the cooling grooves 12 have a defined straight edge of the side walls at the outer circumferential surface. However, if the receiving region 10 is produced by forming, for example, from a sheet metal, or by primary forming, such as casting, entry slopes or radii are formed, which are removed by subsequent cutting machining, preferably of the entire outer circumferential surface. This also improves the accuracy of fit of the outer circumference of the receiving region 10.

The outer circumference of the receiving region 10 has at least one driving groove 11 for receiving corresponding driving projections at the rotor lamination stack R received on the receiving region 10 so as to be fixed with respect to rotation relative to it. Depending on the rotor lamination stack R to be mounted, for example, owing to symmetries or a more uniform distribution of forces, portions of the rotor lamination stack R arranged to be offset along the circumference, and/or different laminations in the rotor lamination stack R, a plurality of driving grooves 11 distributed over the circumference can be provided.

Alternatively or additionally, cooling grooves 12 can also be used as driving grooves 11 or driving grooves 11 can be used as cooling grooves 12. In these cases, they have an identical cross section. Advantageously, driving projections are formed at the rotor lamination stack R, for example, via radial cutouts at the inner circumference, in such a way that they can form a cooling channel with the driving groove 11 or cooling groove 12.

It is also possible that the cooling grooves 12 have a larger cross section, particularly in circumferential direction, than the driving grooves 11. In this way, it can be ensured that no tension is produced in the rotor lamination stack R for reasons of symmetry or the like in driving projections of a rotor lamination stack R which may possibly be arranged in the cooling grooves 12 and that the largest possible cross-sectional surface is available for the cooling channel.

In FIG. 1, the encoder wheel 30 has apertures 32 which are arranged to be aligned with the oil grooves 12 and accordingly also allow the cooling oil supplied via the oil bore holes 13 to exit.

In the depicted embodiment example, the encoder wheel 30 has markings 31 to work in combination with a sensor which does not rotate along with the rotor carrier in order to acquire the rotational angle of the rotor. In this instance, the markings are made up of projections and cutouts provided to alternate in radial direction. Depending on the sensor, the markings may also be formed differently, for example, with other geometric configurations, in axial direction and/or with material change such as incorporated or applied materials, for example, a partial coating or inserts. Also, the markings 31 need not be arranged radially inside of the receiving region 10 of the rotor carrier, but can also be arranged in the area of the receiving region 10 or radially outwardly depending on the installation space and positioning of the sensor.

By a radially outwardly protruding region, the encoder wheel 30 also forms an axial limit L of the receiving region 10 abutted by the rotor lamination stack R to be mounted.

The encoder wheel 30 is formed, according to one aspect of the invention, from a nonmagnetic material in order to prevent influence on the magnetic properties of the rotor.

Figure 2:
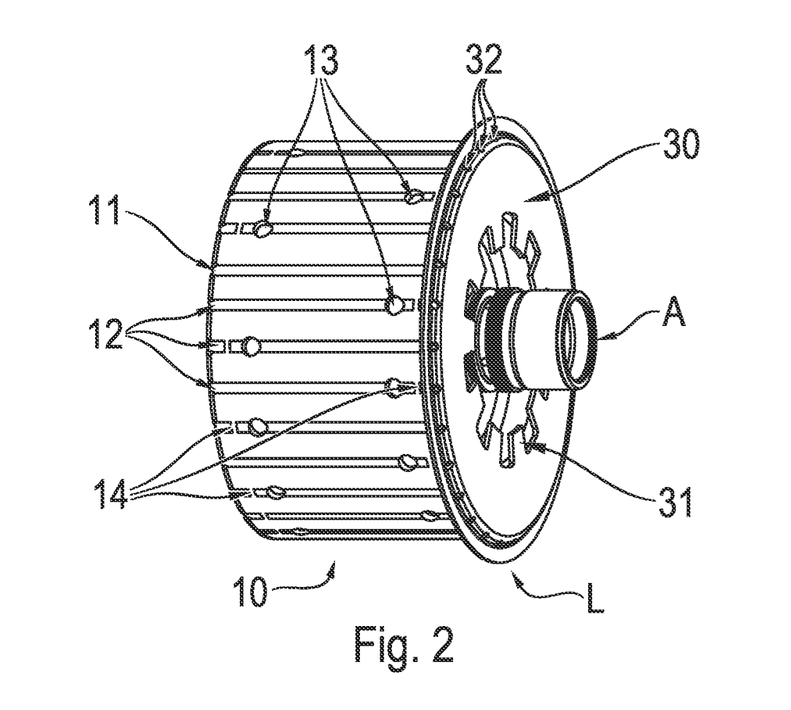
FIG. 2 is a perspective view of a rotor carrier.

As the embodiment example shown in FIG. 2 substantially corresponds to that shown in FIG. 1, reference is made to the above description.

In contrast to FIG. 1, the oil bore holes 13 in FIG. 2 are provided to alternate along the circumference in opposite axial end regions of the cooling grooves 12 rather than centrally. The cooling grooves 12 additionally have a closure portion 14 between the oil bore holes 13 and the nearest axial end of the receiving region 10. The cross section of the cooling groove 12 is closed by the closure portion 14, which at least substantially prevents a flow of cooling oil in this direction. Therefore, every cooling groove 12 has only one axial flow direction, and a more uniform cooling along the axial length is achieved by the alternating arrangement of flow directions.

Figure 3:
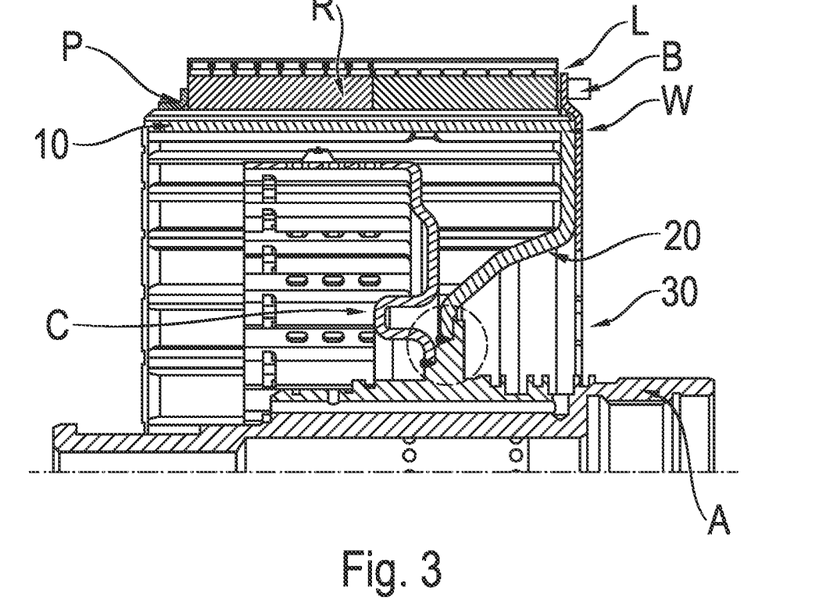
FIG. 3 is a rotor shown in section.

FIG. 3 shows one half of an embodiment example of a rotor carrier with mounted rotor lamination stack R in a sectional view.

In this embodiment example, the receiving region 10 and the carrier region 20 are formed integrally. The carrier region 20 is connected to an axle A so as to be fixed with respect to rotation relative to it. The encoder wheel 30 is connected via a weld W to the receiving region 10 and the carrier region 20, respectively.

Clutch carrier C which is likewise connected to the axle A so as to be fixed with respect to rotation relative to it in this embodiment example is provided inside the receiving region 10. Alternatively or additionally, a clutch carrier C, which may possibly be provided can also be connected directly to the receiving region 10 and/or the carrier region 20. In this embodiment example, the clutch carrier C serves, for example, as an outer plate carrier of a multiple plate clutch.

A rotor lamination stack R which abuts the axial limit L of the encoder wheel 30 with one axial end is arranged on the receiving region 10. In this embodiment example, the rotor lamination stack R is fixed at the opposite axial end by a press ring P, for example, so as to fixedly locate the rotor lamination stack R in axial direction.

Additionally, FIG. 3 shows a balancing mass B to allow a rotational movement as uniform as possible without disruptive imbalances. The balancing mass B is provided in this embodiment example at the axial limit L of the encoder wheel 30. Optionally, the balancing mass B can also be provided at a different location of the rotor.

Figure 4:
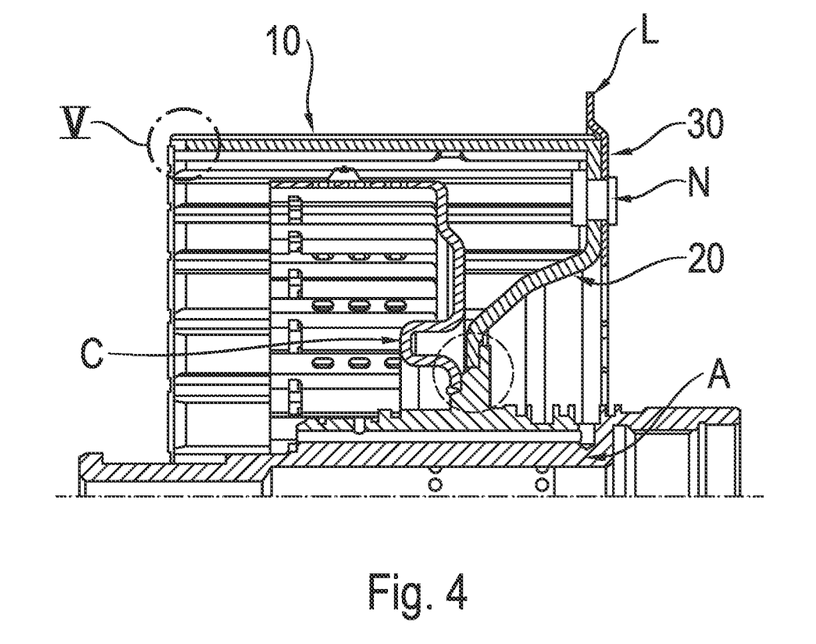
FIG. 4 is a rotor carrier.

As FIG. 4 is substantially similar to FIG. 3, reference is made to the description pertaining to FIG. 3.

Aside from the fact that it does not show a mounted rotor lamination stack R or a balancing mass B, FIG. 4 differs from FIG. 3 in that the encoder wheel 30 is connected to the carrier region 20 by a rivet N. A mechanical positive-engagement connection according to FIG. 4 may be advantageous in place of the material bond connection in FIG. 3 particularly when different materials are to be joined.

Figure 5:
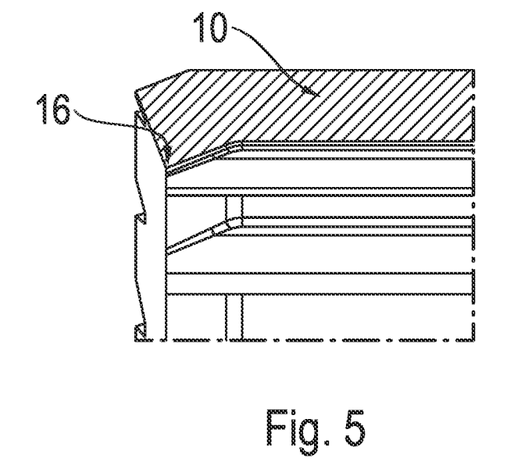
FIG. 5 is an oil dam.

FIG. 5 shows a detail of an open axial end of the receiving region 10 as is indicated in FIG. 4, for example. An oil dam 16, which protrudes inward radially is provided at the receiving region 10. The oil dam 16 prevents a cooling space for cooling oil from forming inside of the receiving region 10 to supply cooling oil to the oil bore holes 13. Accordingly, owing to the centrifugal forces occurring in a rotating rotor carrier, a toroidal collection space forms during operation.

Figure 6:
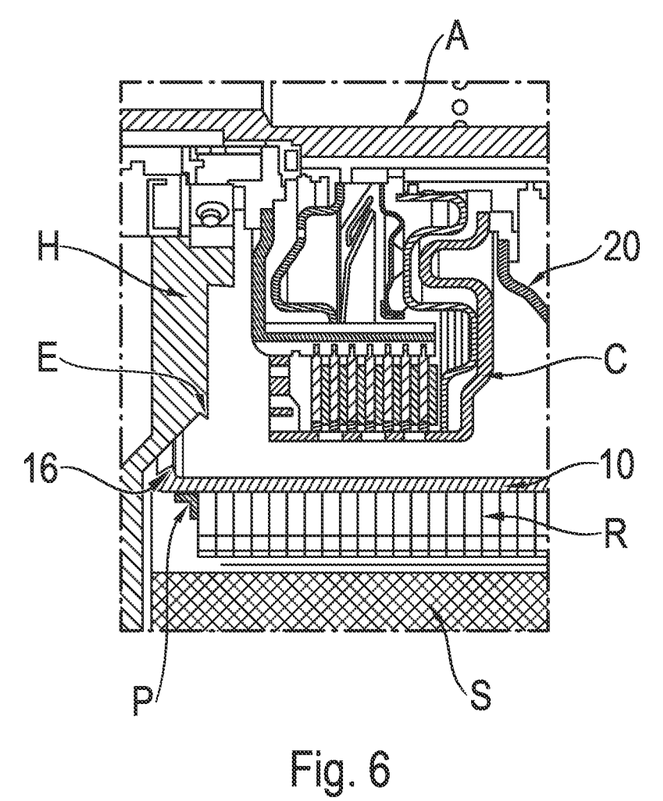
FIG. 6 is a detail of a powertrain.

FIG. 6 shows a detail from an embodiment example of a powertrain. The molded-on oil dam 16 is visible at the receiving region 10. The rotor lamination stack R is also shown. This rotor lamination stack R cooperates with a stator S which is fixed with respect to the frame and is fixed to the receiving region 10 by a press ring P.

FIG. 6 further shows a portion of the housing H, which receives at least the electric machine and, therefore, also the rotor carrier. The housing H has a portion extending axially into the interior of the receiving region 10. A drip edge E is provided at least at the lower end of this portion. The drip edge E ensures that oil running over the interior wall of the housing H drips into the collection space formed by the oil dam 16 at the receiving region 10 so that the amount of cooling oil can be increased.

A drip edge E is provided at least in the lower region, preferably approximately along the lower half of the portion which protrudes axially into the receiving region. It is also possible to configure the drip edge E to be shorter because the greatest effect is achieved in the lower region. Alternatively, the drip edge E can also be longer, for example, it can be provided along the entire circumference, which facilitates production and also allows the drip edge E to be utilized as oil-guiding element for selectively guiding the oil running down the interior wall of the housing H.

Figure 7:
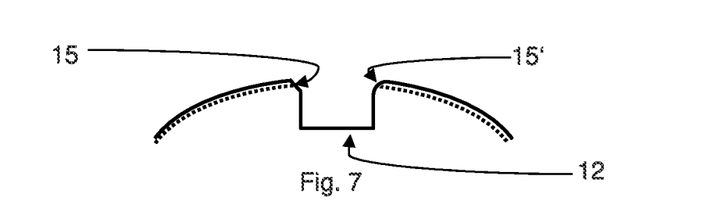
FIG. 7 is a schematic section through a cooling groove viewed in axial direction.

FIG. 7 shows a section through a schematically shown cooling groove 12. The radially outer ends of the cooling groove 12 which form the transition to the outer circumferential surface or outer lateral surface area are shown without a sharp edge. For example, a run-in bevel 15 in which the transition is carried out via an intermediate surface in the manner of a chamfer with obtuse angles is shown at the left-hand transition. A run-in radius 15' in which the transition is carried out via a curved surface, particularly a cylindrical segment, is shown, for example, at the transition on the right-hand side.

FIG. 7 further shows in dashed lines an exemplary shape of the circumferential surface after a mechanical, particularly cutting, after-machining for complying with dimensional and positional tolerances. The run-in bevel 15 or run-in radius 15' effectively prevents the formation of burs projecting into the cooling groove 12, which adversely influence assembly and possibly have a negative result on cooling. In this way, also, a cutting tool which may possibly be utilized is prevented from striking a substantially perpendicular wall of the cooling groove 12 so that the loading of the tool can be improved and, therefore, the life of the tool prolonged.

It will be appreciated that, in addition to variants with different run-in bevels 15 or run-in radii 15' for the two transitions of the cooling groove 12 as shown, for example, in FIG. 7, the transitions can also be provided with like run-in bevels 15 or run-in radii 15' which possibly also facilitates production.

Further, the invention is not limited to the embodiments described herein. As has already been stated, individual advantageous features can also be provided by themselves or combined with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor carrier for an electric machine comprising:
   a hub or shaft;
   a receiving region that is sleeve-shaped;
   at least one carrier region that is flange-like and connected to a hub or shaft;
   at least one driving groove extending in axial direction arranged on an outer circumferential surface of the receiving region;
   a plurality of radial oil bore holes provided in the receiving region to be distributed over the outer circumferential surface of the receiving region; and
   an encoder wheel comprising a nonmagnetic material is provided at an axial end of the rotor carrier, wherein the encoder wheel protrudes over the receiving region in a radial direction to serve as an axial limit for a rotor lamination stack.

2. The rotor carrier according to claim 1, wherein the encoder wheel has markings for a rotational position sensor.

3. The rotor carrier according to claim 1, wherein the encoder wheel is connected to the receiving region and/or the at least one carrier region by material bond and/or positive engagement.

4. The rotor carrier according to claim 1, wherein a plurality of axially arranged cooling grooves are provided to be distributed over the outer circumferential surface of the receiving region, and the plurality of radial oil bore holes each have a diameter that is greater than an inside width of the plurality of axially arranged cooling grooves.

5. The rotor carrier according to claim 4, wherein at least a portion of the plurality of axially arranged cooling grooves extend axially to the encoder wheel, and the encoder wheel has apertures in alignment with the plurality of axially arranged cooling grooves.

6. The rotor carrier according to claim 4, wherein one or more of the plurality of axially arranged cooling grooves has a closure portion such that the one or more of the plurality of axially arranged cooling grooves does not extend over an entire axial length, and in that a respective closure portion is arranged in an area between a respective oil bore hole and a nearest axial end of the rotor carrier.

7. The rotor carrier according to claim 4, wherein the plurality of axially arranged cooling grooves are provided at their radially outer, axially extending end with one of run-in bevels or run-in radii.

8. The rotor carrier according to claim 1, further comprising a circumferential oil dam at an inner circumferential surface of the receiving region at an axial end remote of the encoder wheel, wherein the circumferential oil dam projects radially inward to form a collection space for cooling oil.

9. The rotor carrier according to claim 1, wherein a plurality of driving grooves for driving different lamination stack portions is provided to be distributed over the outer circumferential surface, wherein an angle between the driving grooves deviates by an interleaving angle from a uniform distribution.

10. The rotor carrier according to claim 1, wherein at least two component parts comprising the receiving region, the at least one carrier region, or the encoder wheel are formed integrally.

11. The rotor carrier according to claim 1, wherein a side of a clutch device is connected to an inner circumferential surface of the receiving region and/or the at least one carrier region so as to be fixed with respect to rotation relative to it.

12. An electric machine comprising:
   a rotor carrier comprising:
   a hub or shaft;
   a receiving region that is sleeve-shaped;
   at least one carrier region that is flange-like and connected to a hub or shaft;
   at least one driving groove extending in axial direction arranged on an outer circumferential surface of the receiving region;
   a plurality of radial oil bore holes provided in the receiving region to be distributed over the outer circumferential surface of the receiving region; and
   an encoder wheel comprising a nonmagnetic material is provided at an axial end of the rotor carrier, wherein the encoder wheel protrudes over the receiving region in a radial direction to serve as an axial limit for a rotor lamination stack.

13. The electric machine according to claim 12, further comprising:
   an oil dam at the rotor carrier;
   a housing portion connected to a stator extends into an axial end region remote of the encoder wheel; and
   the housing portion has a drip edge configured to guide cooling oil into a collection space of the rotor carrier.

14. The electric machine according to claim 13, wherein the drip edge extends in circumferential direction only over a partial area.

15. A powertrain comprising:
   an electric machine comprising:
   a rotor carrier comprising:
   a hub or shaft;
   a receiving region that is sleeve-shaped;
   at least one carrier region that is flange-like and connected to a hub or shaft;
   at least one driving groove extending in axial direction arranged on an outer circumferential surface of the receiving region;
   a plurality of radial oil bore holes provided in the receiving region to be distributed over the outer circumferential surface of the receiving region; and
   an encoder wheel comprising a nonmagnetic material is provided at an axial end of the rotor carrier, wherein the encoder wheel protrudes over the receiving region in a radial direction to serve as an axial limit for a rotor lamination stack.

* * * * *